United States Patent
Taylor et al.

(10) Patent No.: US 6,774,079 B1
(45) Date of Patent: Aug. 10, 2004

(54) POLYMERISATION CATALYSTS

(75) Inventors: Michael John Taylor, Sunbury-on Thames (GB); Christel Marie-Claude Mealares, Carry le Rouet (FR); Ian McKenzie Munro, Lake Jackson, TX (US)

(73) Assignee: BP Chemicals Limited, London (GB)

(*) Notice: Subject to any disclaimer, the term of this patent is extended or adjusted under 35 U.S.C. 154(b) by 0 days.

(21) Appl. No.: 09/633,107

(22) Filed: Aug. 4, 2000

(30) Foreign Application Priority Data

Aug. 6, 1999 (GB) .............................................. 9918668

(51) Int. Cl.⁷ .............................. B01J 31/38; C08F 4/44
(52) U.S. Cl. ...................... 502/104; 502/117; 502/152; 526/129; 526/160; 526/943
(58) Field of Search ................................. 502/103, 104, 502/117, 152; 526/129, 160, 943

(56) References Cited

U.S. PATENT DOCUMENTS 6,136,993 A * 10/2000 Chen et al. .................... 556/11

* cited by examiner

Primary Examiner—Robert D. Harlan
(74) Attorney, Agent, or Firm—Finnegan, Henderson, Farabow, Garrett and Dunner, L.L.P.

(57) ABSTRACT

Supported inonic metallocene catalyst prepared by a process comprising the following steps;

(i) mixing together in a suitable solvent
  (a) an metallocene complex,
  (b) an ionic compound comprising a cation and an anion having up to 100 non-hydrogen atoms and containing at least one substituent comprising a moiety having an active hydrogen, and
  (c) optionally a support material, (ii) treating the mixture obtained in (i) with an organometallic compound, and (iii) addition of a support material if not added in step (i), and (iv) removing the solvent.

14 Claims, No Drawings

POLYMERISATION CATALYSTS

BACKGROUND OF THE INVENTION

The present invention relates to catalysts suitable for the polymerisation of olefins and in particular to supported metallocene catalysts providing advantages for operation in gas phase processes.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis (cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis (cyclopentadienyl) and mono (cyclopentadicnyl) complexes in which the metal has the oxidation state of +2 have been described in WO 96/04290 and WO 95/00526 respectively.

The above metallocene complexes are utilised for polymerisation in the presence of a cocatalyst or activator. Typically activators are aluminoxanes, in particular methyl aluminoxane or compounds based on boron compounds. Examples of the latter are borates such as trialkyl-substituted ammonium tetraphenyl borates. Catalyst systems incorporating such borate activators are described in EP-561479, EP 418044 and EP 551277.

The above metallocene complexes may be used for the polymerisation of olefins in solution, slurry or gas phase. When used-in the gas phase the metallocene complex and/or the activator are suitably supported. Typical supports include inorganic oxides eg. silica or polymeric supports may alternatively be used.

A preferred gas phase process for polymerising olefins in the presence of a metallocene catalyst is one operating in a fluidised bed. In such processes the molecular weight of the polyolefin produced by the metallocene complex is determined by the competing rates of chain propagation, chain termination and chain transfer. These rates are in turn determined by the intrinsic kinetics of the catalyst and the reaction environment. In order to produce commercially interesting polyolefins the catalysts must make a high molecular weight polymer. Furthermore at commercial reactor conditions the catalyst must make a molecular weight that exceeds that of commercially interesting polymers such that the molecular weight can be controlled at the desired value with a chain transfer agent such as hydrogen.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with a trialkylaluminium compound followed by subsequent treatment with the support and the metallocene. When used in the gas phase such supported catalysts are extremely active but the molecular weight of the produced polymer is lower than that required for commercial operation.

WO 98/27119 also describes a method for activating a substantially inactive catalyst precursor comprising (a) an ionic compound comprising a cation and an anion containing at least one substituent comprising a moiety having an active hydrogen, (b) a transition metal compound and optionally, (c) a support by treatment with an organometallic compound thereby forming an active catalyst.

We have now surprisingly found that by careful choice of the preparative route to the supported catalyst and the nature of the metallocene complex itself, catalysts based on certain bridged bis (cyclopentadienyl) zirconium complexes and activators based on boron compounds having at least one substituent comprising a moiety having an active hydrogen may be used in gas phase processes to control the chain transfer rate in order to produce polymers in commercial gas phase reactors with the desired molecular weight distribution. The advantage of the invention is such that a wide range of molecular weights and molecular weight distributions may be accessible in the same gas phase process by careful choice of the supported catalyst and it's preparation. Melt index control and improved opticals may also be easier with the supported catalysts of the present invention.

SUMMARY OF THE INVENTION

Thus according to the present invention there is provided a process for the preparation of a supported metallocene catalyst comprising the following steps:
(i) mixing together in a suitable solvent
    (a) a metallocene of formula:

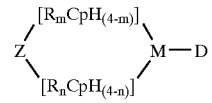

wherein Cp is a cyclopentadienyl ligand,
each R group represents an alkyl or an aryl substituent or two R groups may be joined together to form a ring,
Z is a bridging group comprising an alkylidene group having 1–20 carbon
atoms or a dialkyl silyl or germanyl group,
M is zirconium in the +2 formal oxidation state
D is a neutral $\eta^4$ bonded diene group having up to 30 non-hydrogen atoms which forms a π-complex with M,
and n and m are the same or different and equal 0–4, and
    (b) an ionic compound comprising a cation and an anion having up to 100 non-hydrogen atoms and containing at least one substituent comprising a moiety having an active hydrogen, and
    (c) optionally a support material,
(ii) treating the mixture obtained in (i) with an organometallic compound, and
(iii) addition of a support material if not added in step (i), and
(iv) removing the solvent.

A suitable solvent for the supported catalyst preparation is toluene.

DETAILED DESCRIPTION OF THE INVENTION

The preferred metallocene complexes are those wherein Z is $CH_2CH_2$ and two adjacent R groups are joined together to form a ring. For example adjacent R groups may form an indenyl or a fluorenyl ring.

The D ligand is most preferably chosen from the group: s-trans-$\theta^4$,4-diphenyl-1,3-butadiene; s-trans-$\theta^4$-3-methyl-1, 3-pentadiene; s-trans-$\theta^4$-1,4-dibenzyl-1,3-butadiene; s-trans-$\theta^4$-2,4-hexadiene; s-trans-$\theta^4$-1,4-ditolyl-1,3-butadiene; s-trans-$\theta^4$-1,4-bis(trimethylsilyl)-1,3-butadiene; s-cis-$\theta^4$-1,4-diphenyl-1,3-butadiene; s-cis-$\theta^4$-3-methyl-1,3-pentadiene; s-cis-$\theta^4$-2,4-hexadiene; s-cis-$\theta^4$2,4-hexadiene; s-cis-$\theta^4$1,3-pentadiene; s-cis-$\theta^4$-1,4-ditolyl-1,3-butadiene; and s-cis-$\theta^4$-1,4-bis(trimethylsilyl)-1,3-butadiene, said s-cis diene group forming a π-complex as defined herein with the metal.

Particularly suitable are externally substituted dienes in particular the 1,4-diphenyl substituted butadienes.

The preparation of these complexes is extensively described in the aforementioned WO 96/04290 which also lists examples of representative complexes for use in the present invention. The appropriate parts of this disclosure are incorporated herein by reference.

The most preferred complex is ethylene bis(indenyl) zirconium (II) 1,4-diphenyl butadiene.

The cation of the ionic compound may be selected from the group consisting of acidic cations, carbonium cations, silylium cations, oxonium cations, organometallic cations and cationic oxidizing agents.

Suitable cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

Particularly suitable cations are tri-substituted ammonium salts, in particular those comprising at least one relatively long alkyl group such as decyldi(methyl)ammonium or dodecyldi(methyl)ammonium or methyl di(octadecyl) ammonium and similar.

The anions of the ionic compound are boron containing compounds.

Particularly preferred anions are tri-substituted aryl borates.

For example anions such as triphenyl(hydroxyphenyl) borate or triphenyl(2,4-dihydroxyphenyl)borate or tri(pentafluorophenyl)(hydroxyphenyl) borate and similar are preferred.

A particular preferred ionic compound is bis(hydrogenated tallow alkyl)methyl ammonium tris(pentafluorophenyl)(4-hydroxyphenyl)borate.

Examples of suitable ionic compounds are those disclosed in the aforementioned WO 98/27119 incorporated herein by reference.

The molar ratio of metallocene complex to ionic compound employed in the process of the present invention may be in the range 1:10000 to 100:1. A preferred range is from 1:5000 to 10:1 and most preferred from 1:10 to 10:1.

The organometallic compound is typically chosen from those containing a metal of Groups 1–14 of the Periodic Table but preferred organometallic compounds are those containing aluminium. Particularly preferred organometallic compounds are trialkylaluminium compounds for example trimethylaluminium, triethylaluminium or triisobutylaluminium.

Suitable supports include inorganic metal oxides or alternatively polymeric supports may be used.

The most preferred support material for use with the supported catalysts according to the process of the present invention is silica. Suitable silicas include Crosfield ES70 and Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

The pretreated support is preferably recovered before use in the preparation of the supported catalysts of the present invention.

The support material pretreated with an organometallic compound may suitably be used to activate the metallocene/ionic compound of the present invention. In this alternative procedure the pretreated support is contacted with the mixture resulting from step (i) in the above procedure.

Alternative supports for the present invention are non-porous polystyrenes for example divinylbenzene crosslinked polystyrene.

In the preferred process for preparing the supported catalysts of the present invention the support material is added after the addition of the organometallic compound.

Thus according to a preferred feature of the present invention there is provided a process for the preparation of a supported metallocene catalyst comprising the following steps:

(i) mixing together in a suitable solvent
   (a) a metallocene of formula hereinbefore described, and
   (b) an ionic compound comprising a cation and an anion having up to 100 non-hydrogen atoms and containing at least one substituent comprising a moiety having an active hydrogen, and
(ii) treating the mixture obtained in (i) with an organometallic compound,
(iii) contacting the mixture from (ii) with a support material, and
(iv) removing the solvent.

The most preferred support material is a silica pretreated with an organometallic compound and most preferably a silica pretreated with an aluminium trialkyl compound.

It has also been found that a particularly preferred aluminium trialkyl is triisobutylaluminium.

In the preferred preparation of the supported metallocene catalyst of the present invention, the support material is contacted with the mixture from step (ii) at room temperature. In a particularly preferred preparation the contact takes place at elevated temperature for example in the range 55 to 75° C. A preferred temperature is in the range 60 to 70° C.

By performing step (iii) at an elevated temperature enables scale up to be performed more easily.

The supported metallocene catalysts of the present invention are most suitable for operation in the gas phase. Gas phase processes for the polymerisation of olefins, especially for the homopolymerisation and the copolymerisation of ethylene and α-olefins for example 1-butene, 1-hexene, 4-methyl-1-pentene are well known in the art. Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms. Preferred α-olefins are butene and hexene.

Thus according to another aspect of the present invention there is provided a gas phase process for the polymerisation of ethylene or the copolymerisation of ethylene and α-olefins having from 3 to 10 carbon atoms, said process comprising polymerising said ethylene and said α-olefins in the presence of a supported metallocene catalyst prepared as hereinbefore described.

The preferred gas phase process is performed in a fluidised bed.

By use of the supported catalysts of the present invention control of the molecular weight of the polymers may be achieved compared to processes using supported metallocene catalysts from other preparative routes.

For example the aforementioned WO 98/27119 exemplifies supported metallocene catalysts in which the ionic compound is first treated with an organometallic compound before contact with the metallocene complex. Use of such supported metallocene catalysts in the gas phase results in polymers having a lower molecular weight than those obtained by use of the supported metallocene catalysts of the present invention.

Hence a wide range of molecular weights and molecular weight distributions may be accessible in the same gas phase process by careful choice of the supported catalyst and it's preparation.

The present invention will now be further illustrated by reference to the following examples:

Experimental Details

Unless otherwise stated, all manipulations were carried out in an inert atmosphere, either in a nitrogen-filled glove box or under nitrogen using Schlenk techniques.

Polymerisation Procedure

A 2.5 liter agitated dry phase reactor (ADPR) was used to test for olefin polymerisation activity. Ethylene copolymers incorporating ca. 10% wt hexene were prepared in all evaluations. In a typical experiment, dry sodium chloride, 300 to 400 g, is added to the adpr under a $N_2$ flow and stirred at 300 rpm. Ethylene, hexene and hydrogen are admitted to establish the required gas phase composition (typically, T=70° C. pC2=7 bar, pC6/pC2 as required to obtain 10% wt comonomer in the polymer). Hydrogen (if required) can either be added in one aliquot at the start, or be added as a constant proportion to the ethylene. An accurately weighed amount of catalyst (between 0.04 and 0.12 g) is injected into the reactor. During the run, the presence of a scavenger may be required in the salt bed and/or can be injected with the catalyst (alkyl aluminium treated silica or KH are suitable scavenger materials and might be required at levels upto ca. 1 g depending upon the purity of the reactor and feed gases). The gas phase composition is maintained at initial levels (ethylene on demand to maintain pressure, whilst hexene is added to maintain C6/C2 ratio in the gas phase as monitored by mass spectrometry). Ethylene uptake is monitored with time, as are other variables such as temperature and hexene uptake. Activity is quoted as $g(polymer)g(catalyst)^{-1}hr^{-1}$ $bar^{-1}$, measured over a 90 minute period. Polymer is recovered from the reactor and is washed with water or ethanol/water then dried in a vacuum oven. Melt flow measurements (MI) were determined by method ASTM1238.

EXAMPLE 1

Preparation of Impregnated Polystyrene Supported Catalysts

2% Divinylbenzene crosslinked polystyrene (200–400 mesh, dense beads, Polyscience Inc.), 20 g, was washed with 2×50 ml of toluene. Solvent was removed by filtration, the solid was placed in a Schlenk tube and volatiles were removed under reduced pressure. Pumping was continued for 14 hours. Bis (hydrogenated tallow alkyl) methylammonium tris(pentafluorophenyl)(4-hydroxyphenyl)borate (hereafter ionic compound A), 0.8372 g of a 50 μmol/g toluene solution (41.9 μmol) was added to rac.ethylenebridged indenyl zirconium(II) (1,4-diphenylbutadiene), 1.3011 g of a 30 μmol/g toluene solution (39.0 μmol). After standing at ambient for 30 minutes the resulting yellow solution was added to washed (see above) 2%DVB cross linked polystyrene beads, 1.965 g. Solvent was removed under reduced pressure, with pumping continued for 3 hours after visible outgassing had ceased. The resulting yellow solid was tested for polymerisation activity in the ADPR, and no ethylene uptake was observed. (Run 1).

To all of the yellow solid above, $AlEt_3$ (50 μl, 366 μmol) in toluene, 0.5 g was added, and the mixture was left at ambient for 30 minutes. The yellow solid became dark. Volatiles were removed under reduced pressure, and pumping was continued for 14 hours. The resulting red/brown solid was tested in the ADPR (Run 2). To the remaining solid was added $AlEt_3$ (0.1421 g, 1246 μmol) in toluene, 0.627 g. The mixture was left at ambient for 20 minutes with no apparent colour change. Volatiles were removed under reduced pressure and the resulting solid was tested in the ADPR.(Run 3).

The results of the ADPR testing for Example 1 (runs 1–3) are given below in Table 1

TABLE 1

| Run | Zr and B loading (μmol/g) | Al/Zr ratio | Activity (g/g.hr.bar) | Bulk density | MI (2.16) |
|---|---|---|---|---|---|
| 1 | 20 | 0 | 0 | | |
| 2 | 20 | 9 | 136 | 0.40 | 0.50 |
| 3 | 20 | 31 | 31 | 0.37 | 0.25 |

EXAMPLE 2

Preparation of TEA Treated Calcined Silica

In a typical preparation, Crosfield ES70 silica, 15 kg, was calcined for 5 hours at 500° C. under $N_2$. To the silica was added Stadis-425 anti-static additive (2 g/l in hexane) to achieve 150 ppm Stadis in the silica. To the Stadis treated silica was added hexane, 110 liters. The silica/hexane slurry was treated with TEA in hexane (22.8 liters of 0.985M TEA in hexane, 1.5 mmol of TEA/g silica), and the mixture was maintained at 30° C. for 2 hours with stirring. Hexane was decanted, and the silica washed with hexane (until the Al level<0.5 mmol/l in the hexane washes) and dried under vacuum at 60° C. until residual solvent <0.5% wt. The aluminium loading was measured by atomic absorption analysis and is typically ca.1 mmol/g.

EXAMPLE 3

To 1.6 ml of 0.026M (EBI)Zr(dpbd) in toluene was added 0.5 ml of 0.081M ionic compound A in toluene. The mixture was allowed to stand for 0.5 hours. The above mixture was added to 2.0 g of Et$_3$Al treated ES-70 silica in a 100 ml Schlenk flask and shaken until the powder was uniform and free flowing. The powder mixture was left for one hour and then it was dried under vacuum at ambient temperature until the point where spouting ceased. To 2.25 ml of hexane were added 125 µl of 1M Et$_3$Al in hexane (Aldrich). This hexane solution of Et$_3$Al was added, quantitatively, to the silica mixture and the combined mixture was agitated until the powder was uniform, dry, and free flowing. The mixture was left to stand for about an hour and then the solvent was removed under vacuum at ambient temperature until the powder ceased to spout. The catalyst was tested for olefin polymerization activity under a standard set of reaction conditions in the ADPR.

EXAMPLE 4 (COMPARATIVE)

To 0.8 ml of a 0.081M in toluene solution of ionic compound A was added 40 µl of 1.76M Et$_3$Al in toluene. This mixture was quantitatively added to 2.0 g of Et$_3$Al treated ES-70 silica in a 100 ml Schlenk flask and the resulting mixture was agitated until the powder was uniform and free flowing. The solvent was removed under vacuum at ambient temperature to the point where the powder did not spout. Immediately after, 2.1 ml of 0.026M (EBI)Zr(dpbd) in toluene was added and the powder was again agitated until it became uniform and free flowing. The solvent was removed under vacuum at ambient temperature to the point where the powder did not spout. The catalyst was tested for olefin polymerization activity under a standard set of reaction conditions in the ADPR.

Polymerisation results for Examples 3 and 4 are shown in Table 2.

TABLE 2

| Catalyst | Activity g/ghb | % C6 | H$_2$ | MI 2.16 | Temp ° C. |
|---|---|---|---|---|---|
| Example 3 | 110 | 9.8 | 0 | 0.5 | 70.2 |
| Example 3 | 99 | 10 | 5000 | 1.8 | 70.3 |
| Example 4 | 83 | 9.8 | 0 | 5 | 70.2 |
| Example 4 | 71 | 10 | 5000 | 15 | 70.3 |

NB. %C6 is the average 1-hexene incorporation in the polymer over 90 min. H2 is the concentration in ppmv of H2 in the ethylene.

EXAMPLE 5

To 3.0 ml of 1.67%w/w toluene solution of rac ethylene-bridged indenyl zirconium (II) (1,4-diphenylbutadiene) (79 µmol), 1.61 ml of a 9.7%w/w toluene solution of ionic compound A (119 µmol) was added. The solution was left at ambient temperature for 30 minutes, during which the colour changed from red to yellow/orange. To this solution, 0.525 ml of TMA in toluene (131 µmol) was added. The mixture was left at ambient temperature for 15 min, during which the colour changed to dark brown. This was added drop wise to 3 g of TEA treated Crosfield ES70 silica. During solution addition, the silica was constantly agitated, which was continued until no visible lumps remained. After mixing at ambient temperature for 1 hour, volatiles were removed under reduced pressure at ambient. Pumping was continued for 30 min after visible outgassing of the silica had ceased. A grey solid was obtained.

EXAMPLE 6

To 3.0 ml of a 1.67%w/w toluene solution of rac ethylenebridged indenyl zirconium (II) (diphenylbutadiene) (79 µmol), 1.61 ml of a 9.7%w/w toluene solution of ionic compound A (119 µmol) was added. The solution was left at ambient temperature for 30 minutes, during which the colour changed from red to yellow/orange. To this solution, 0.525 ml of 0.25M TEA in toluene (131 µmol) was added. The mixture was left at ambient temperature for 15 min, during which the colour changed to dark green. This was added drop wise to 3 g of TEA treated Crosfield ES70 silica. During solution addition, the silica was constantly agitated, which was continued until no visible lumps remained. After standing at ambient for 1 hour, volatiles were removed under reduced pressure. Pumping was continued for 30 min after visible outgassing of the silica had ceased.

EXAMPLE 7

To 3.0 ml of a 1.67%w/w toluene solution of rac ethylenebridged indenyl zirconium (II) (1,4-diphenylbutadiene) (79 µmol), 1.61 ml of a 9.7%w/w toluene solution of ionic compound A (119 µmol) was added. The solution was left at ambient temperature for 30 minutes, during which the colour changed from red to yellow/orange. To this solution, 0.525 ml of 0.25M TiBAl in toluene (131 µmol) was added. The mixture was left at ambient temperature for 15 min, during which the colour changed to dark yellow/green. This was added drop wise to 3 g of TEA treated Crosfield ES70 silica. During solution addition, the silica was constantly agitated, which was continued until no visible lumps remained. After mixing at ambient temperature for 1 hour, volatiles were removed under reduced pressure at ambient. Pumping was continued for 30 min after visible outgassing of the silica had ceased. A grey solid was obtained.

EXAMPLE 8

10 g of Crosfield ES70 silica was calcined for 5 h at 500° C. under nitrogen. This was slurried with 50 ml of hexane then treated with 15 ml of 0.99 M TiBAl in hexane (1.5 mmol TiBAl/g silica). This was mixed for 30 min at ambient temperature, filtered, washed with hexane (3 times 30 ml) and dried under vacuum at ambient temperature. Al measurement by AA analyses gave 0.89 mmol Al/g.

To 3.0 ml of a 1.67%w/w toluene solution of rac ethylenebridged indenyl zirconium (II) (1,4-diphenylbutadiene) (79 µmol), 1.61 ml of a 9.7%w/w toluene solution of ionic compound A (119 µmol) was added. The solution was left at ambient temperature for 30 minutes, during which the colour changed from red to yellow/orange. To this solution, 0.495 ml of 0.265M TiBAl in toluene (131 µmol) was added. The mixture was left at ambient temperature for 15 min, during which the colour changed to dark green. This was added drop wise to 3 g of TiBAl treated Crosfield ES70 silica (as described above). During solution addition, the silica was constantly agitated, which was continued until no visible lumps remained. After mixing at ambient temperature for 1 hour, volatiles were removed under reduced pressure at ambient. Pumping was continued for 1 hour after visible outgassing of the silica had ceased. A grey/pink solid was obtained.

EXAMPLE 9

To 49.9 ml of a 1.67%w/w toluene solution of rac ethylenebridged indenyl zirconium (II) (1,4- diphenylbutadiene) (1.325 mmol), 26.82 ml of a 9.7%w/w toluene solution of ionic compound A (1.987 mmol) was added. The solution was left at ambient temperature for 30 minutes, during which the colour changed from red to yellow/orange. To this solution, 8.75 ml of 0.25M TiBAl solution in toluene (2.18 mmol) was added. The mixture was left at ambient temperature for 15 min, during which the colour changed to dark green. This was added drop wise to 50 g of TEA treated Crosfield ES70 silica. During solution addition, the silica was constantly agitated, which was continued until no visible lumps remained. After mixing at 60° C. for 1 hour, volatiles were removed under reduced pressure at 60° C. Pumping was continued for 30 min after visible outgassing of the silica had ceased. A grey solid was obtained.

EXAMPLE 10

To rac. ethylenebridged indenyl zirconium(II) (1,4-diphenylbutadiene), 10 liters of a 1.67%w/w solution in toluene, ionic compound A 4.8 liters of a 10.7%w/w solution in toluene was added. The solution was stirred at 30° C. for 30 minutes, during which time the colour changed from red to yellow/orange. To this solution, Al(i-Bu)$_3$ was added, 1.65 liters of 0.27M solution in toluene, and the mixture was stirred for 1 hour at 30° C. This solution was added quantitatively to TEA treated silica (see above), 10 kg, giving a final composition of 1.7 ml of toluene/g of silica. The temperature of the impregnated silica was raised to 60° C., at which it was held for 1 hour whilst the silica was agitated. Solvent was removed under reduced pressure at 60° C. until a final pressure of 15–20 mbar (residual solvent 1–2% wt) was achieved. This catalyst was subjected to ADPR evaluation and pilot plant trials.

Abbreviations

Chemical Formulae

| | | |
|---|---|---|
| TEA | AlEt$_3$ | Triethylaluminium |
| TMA | AlMe$_3$ | Trimethylaluminium |
| TiBAl | Al(iBu)$_3$ | Tri(isobutyl)aluminium |
| EBI.Zr$^{II}$(dpbd) | C$_{36}$H$_{30}$Zr | rac. Ethylenebridged indenyl zirconium(II) (1,4-diphenylbutadiene) |
| ionic compound A | — | bis(hydrogenated tallow alkyl)-methylammonium tris(pentafluorophenyl)(4-hydroxyphenyl)borate |
| PS | —(CH$_2$CHPh)$_n$— | Polystyrene |

Polymerisation results for Examples 5–10 are shown in Table 3. For each catalyst a number of runs under the conditions given in the Table were performed.

TABLE 3

| Catalyst | Activity g/ghb | H$_2$ ml | MI (2.16) | density g/cm$^3$ | yield g/g |
|---|---|---|---|---|---|
| Example 5 | 133 | 0 | 0.3 | 0.916 | 1330 |
|  | 125 | 80 | 1.8 | 0.919 | 1190 |
| Example 6 | 203 | 0 | 0.61 | 0.921 | 1991 |
|  | 189 | 40 | 1.62 | 0.920 | 1854 |
| Example 7 | 221 | 0 | 0.2 | 0.915 | 2222 |
|  | 178 | 80 | 0.4 | 0.920 | 1750 |
|  | 182 | 120 | 0.7 | 0.918 | 1840 |
|  | 152 | 160 | 2.9 | 0.917 | 1420 |
| Example 8 | 131 | 0 | 0.29 | 0.916 | 1386 |
|  | 134 | 80 | 0.22 | 0.920 | 1505 |

TABLE 3-continued

| Catalyst | Activity g/ghb | H$_2$ ml | MI (2.16) | density g/cm$^3$ | yield g/g |
|---|---|---|---|---|---|
| Example 9 | 164 | 80 | 0.8 | 0.919 | 1581 |
|  | 133 | 120 | 1.35 | 0.919 | 1599 |
| Example 10 | 77 | 0 | 0.15 | 0.921 | 1105 |
|  | 110 | 80 | 1.1 | 0.921 | 1406 |
|  | 127 | 120 | 1.75 | 0.921 | 1400 |

We claim:

1. A process for the preparation of a supported metallocene catalyst consisting essentially of the following steps:
    (i) mixing together in a suitable solvent
        (a) a metallocene of formula:

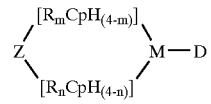

wherein each Cp is a cyclopentadienyl ligand,
    each R group represents an alkyl or an aryl substituent or two R
    groups may be joined together to form a ring,
    Z is a bridging group comprising an alkylidene group having 1–20
    carbon atoms or a dialkyl silyl or germanyl group,
    M is zirconium in the +2 formal oxidation state
    D is a neutral $\eta^4$ bonded diene group having up to 30 non-hydrogen atoms which forms a π-complex with M,
    and n and m ate the same or different and equal 0–4, and
        (b) an ionic compound comprising a cation and an anion having up to 100 non-hydrogen atoms and containing at least one substituent comprising a moiety having an active hydrogen, and
        (c) optionally a support material,
    (ii) treating the mixture obtained in (i) with an organometallic compound, and
    (iii) addition of a support material if not added in step (i), and
    (iv) removing the solvent.

2. A process according to claim 1 where Z is CH$_2$CH$_2$ and two adjacent R groups are joined together to form a ring.

3. A process according to claim 1 wherein the metallocene is ethylene bis(indenyl)zirconium (II) 1,4-diphenyl butadiene.

4. A process according to claim 1 wherein the cation of the ionic compound comprises a tri-substituted ammonium salt and the anion comprises a tri-substituted aryl borate.

5. A process according claim 4 wherein the ionic compound is bis(hydrogenated tallow alkyl)methyl ammonium tris(pentafluorophenyl)(4-hydroxyphenyl)borate.

6. A process according to claim 1 wherein the organometallic compound comprises a metal of group 1–14 of the Periodic Table.

7. A process according to claim 6 wherein the organometallic compound is a trialkylaluminium compound.

8. A process according to claim 1 wherein the support material is silica.

9. A process according to claim 8 wherein the silica is pretreated with an organometallic compound.

10. A process according to claim 9 wherein the organometallic compound is a trialkylaluminium compound.

11. A process for the preparation of a supported metallocene catalyst consisting essentially of the following steps:
(i) mixing together in a suitable solvent
(a) a metallocene of formula:

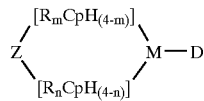

wherein Cp is a cyclopentadienyl ligand, each R group represents an alkyl or an aryl substituent or two R groups may be joined together to form a ring, Z is a bridging group comprising an alkylidene group having 1–20 carbon atoms or a dialkyl silyl or germanyl group, M is zirconium in the +2 formal oxidation state, D is a neutral $\eta^4$ bonded diene group having up to 30 non-hydrogen atoms which forms a π-complex with M, and n and m are the same or different and equal 0–4, and (b) an ionic compound comprising a cation and an anion having up to 100 non-hydrogen atoms and containing at least one substituent comprising a moiety having an active hydrogen, (ii) treating the mixture obtained in (i) with an organometallic compound, (iii) contacting the mixture from (ii) with a support material, and (iv) removing the solvent.

12. A process according to claim 11 wherein the organometallic compound is triisobutylaluminium.

13. A process according to claim 11 wherein step (iii) is performed at elevated temperature.

14. A process according to claim 13 wherein the temperature is in the range 55–75° C.

* * * * *